(12) United States Patent
Chen

(10) Patent No.: US 7,290,916 B2
(45) Date of Patent: Nov. 6, 2007

(54) FIELD EMISSION LIGHT SOURCE AND A RELATED BACKLIGHT DEVICE

(75) Inventor: Ga-Lane Chen, Fremont, CA (US)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 149 days.

(21) Appl. No.: 11/301,581

(22) Filed: Dec. 13, 2005

(65) Prior Publication Data
US 2006/0133107 A1 Jun. 22, 2006

(30) Foreign Application Priority Data
Dec. 17, 2004 (TW) .............................. 93139381 A

(51) Int. Cl.
F21V 7/04 (2006.01)
H01J 1/02 (2006.01)
H01J 63/04 (2006.01)
(52) U.S. Cl. .................. 362/613; 313/309; 313/495; 362/611
(58) Field of Classification Search ................ 362/611, 362/613; 313/309, 495
See application file for complete search history.

(56) References Cited

U.S. PATENT DOCUMENTS 6,582,091 B2 * 6/2003 Funamoto et al. .......... 362/601
6,710,551 B2    3/2004 Mita et al.
6,781,327 B2    8/2004 Ohsawa
2006/0132015 A1* 6/2006 Chen .......................... 313/309

FOREIGN PATENT DOCUMENTS

CN    00107813.5    1/2001

* cited by examiner

Primary Examiner—Stephen F. Husar
Assistant Examiner—James W Cranson, Jr.
(74) Attorney, Agent, or Firm—Jeffrey T. Knapp

(57) ABSTRACT

A light source (100) provided herein generally includes a substrate (110), a cathode (120), an isolating layer (122), a light-permeable anode (152), and at least one fluorescent layer (154). The substrate has a surface, and the cathode, with at least one solid electron emitter formed thereon, is located on the surface of the substrate. The isolating layer is formed on the cathode. The light-permeable anode faces the field emitters and is spaced from the cathode to form a vacuum chamber. The at least one fluorescent layer is formed on the anode. Such a light source can then be incorporated, e.g., into a backlight module (300) for an LCD device.

18 Claims, 3 Drawing Sheets

FIELD EMISSION LIGHT SOURCE AND A RELATED BACKLIGHT DEVICE

RELATED APPLICATION

This application is related to commonly-assigned application No. 11/301,784 entitled, "A FIELD EMISSION LIGHT SOURCE AND A RELATED BACKLIGHT DEVICE", filed concurrently herewith, on Dec. 13, 2005.

BACKGROUND

1. Field of the Invention

The invention relates generally to a light source and, more particularly, to a field emission light source for use in a backlight device.

2. Discussion of Related Art

The conventional artificial light sources include, for example, incandescent lamps, fluorescent lamps, light emitting diodes (LED), high-intensity discharge lamps (HID), incandescent lamps, and halogen lamps. An incandescent lamp uses a glowing wire filament to generate light and heat by electrical resistance. Because of its poor efficiency, incandescent lamps are generally used in household illumination and are gradually being replaced by fluorescent lights, high-intensity discharge lamps, LEDs, and other more efficient devices.

A fluorescent lamp is a type of lamp that uses electricity to excite mercury vapor in argon or neon gas, resulting in a plasma that produces short-wave ultraviolet light. This light then causes a phosphor to fluoresce, producing visible light. Fluorescent lamps are much more efficient than incandescent lamps of an equivalent brightness and have a longer lamp life, in part, because such lamps operate at a much lower working temperature. However, the use of mercury makes fluorescent lamps unaccommodating to the demands of environmental protection.

A light-emitting diode (LED) is a special type of semiconductor diode that emits incoherent narrow-spectrum light when electrically biased in the forward direction. LEDs are capable of emitting light of an intended color without the use of color filters that traditional lighting methods require. LEDs give off less heat than incandescent lamps and are less fragile than fluorescent lamps. Thus, LED-based light sources are generally used for household illumination and outdoor signals.

A high-intensity discharge (HID) lamp produces light by striking an electrical arc across tungsten electrodes housed inside a specially designed inner fused quartz or fused alumina tube. Compared to fluorescent and incandescent lamps, HID lamps produce a large quantity of light in a small package. So, HID lamps are typically used when high levels of light are required over large areas and when energy efficiency and/or long life are desired. However, the operation of HID lamps must withstand a high voltage up to 23,000 volts at the start of lighting and must maintain a voltage of 8,000 volts to provide a continuously steady lighting. Such lamps thereby require a special voltage-transforming device, which increases an overall size of the lighting device.

Referring to FIG. 5 (Prior Art), a light source using carbon nanotubes solves the above problems. The light source includes a metal film 510, a lower substrate 520, a conductive polymer film pattern 530, carbon nanotubes 540, a transparent upper substrate 550, a transparent electrode 560, and a fluorescent body 570. The metal film 510 is used as a cathode and is formed on the lower substrate 520. The conductive polymer film pattern 530 is formed on the metal film 510. The carbon nanotubes 540 are substantially vertically bound with the conductive polymer film pattern 530 such that one end thereof is exposed above the surface of the conductive polymer film pattern and such that the other end thereof is available for emitting electrons. The transparent upper substrate 550 has the transparent electrode 560 to which the fluorescent body 570 is attached. Further, the transparent electrode 560 is mounted on the spacers such that the fluorescent body 570 faces the carbon nanotubes 540. The white light source has an excellent electric field electron emission efficiency to thereby obtain a large emission current even at a low applied voltage and has a very high density of electron emitters per unit area to thereby exhibit excellent luminous efficacy.

However, the carbon nanotubes, used in the above light source for emitting electrons, are hollow. During the operation of the electron emission in the effect of the electric field, the carbon nanotubes are easily distorted, and therefore, the life span of such a white light source is short. Furthermore, because the carbon nanotubes are substantially vertically attached on the conductive polymer film pattern, another problem may result. Specifically, when the effect of the electric field is increased, the carbon nanotubes can possibly break away from the conductive polymer film pattern. Such separation can also decrease the life span of the white light source.

What is needed, therefore, is a light source having both field emission efficiency and a long life span.

SUMMARY

A light source provided herein generally includes a substrate, a cathode, an isolating layer, a light-permeable anode, and at least one fluorescent layer. The substrate has a surface, and the cathode, with at least one solid electron emitter formed thereon, is located on the surface of the substrate. The isolating layer is formed on the cathode. The light-permeable anode faces the field emitters and is spaced from the cathode to form a vacuum chamber. The at least one fluorescent layer is formed on the anode.

The electron emitters include a plurality of isolating posts extending from the isolating layer and a plurality of nano-tips formed on respective top ends of the isolating posts. The isolating posts and the isolating layer are made of the same material, including, e.g., silicon carbide or diamond-like carbon. The nano-tip is comprised of molybdenum, niobium, tungsten, or another emissive metal or alloy. The isolating post is one of cylindrical, conical, annular, and parallelepiped-shaped in shape. The nano-tip is configured to be in a form of a frustum or a cone. A base of the nano-tip has diameter about equal to the diameter of the isolating post. The light source further advantageously includes a nucleation layer sandwiched between the cathode and the substrate or the isolating layer.

A backlight device generally includes a light source and a light guide plate. The light source of the present device includes a cathode; a plurality of solid field emitters located on the cathode; and a light-permeable anode arranged over and facing the field emitters. The light guide plate includes an incident corner facing the light-permeable anode, the incident corner thereof being adapted for receiving light emitted from the light source. Alternatively, multiple such light sources may be employed and arranged to face a light-incident surface of the light guide plate.

The electron emitters includes a plurality of isolating posts extending from the isolating layer and a plurality of nano-tips formed on respective top ends of the isolating posts. The light guide plate includes a light emitting surface. The light emitting surface is, advantageously, patterned to have a plurality of arc-shape protrusions thereon. The density of such arcs becomes higher the greater the distance from the light source.

Compared with a conventional light source, the electron emitters of the present field emission light source are solid in cross section (i.e., not hollow tubes). Thus, the electron emitters can't readily be distorted during electron emission and/or under the increased effect of the electric field. That is, the electron emitters aren't easy to mechanically disable. Therefore, the present field emission light source tends to have a long life span. As such, while the present light source is illustrated as being used in relation to a backlight module for an LCD device, it is to be understood that the light source can be potentially employed in any situation in which a light source is required.

Other advantages and novel features of the present field emission light source and the related backlight device will become more apparent from the following detailed description of preferred embodiments, when taken in conjunction with the accompanying drawings.

BRIEF DESCRIPTION OF THE DRAWINGS

Many aspects of the present field emission light source can be better understood with reference to the following drawings. The components in the drawings are not necessarily to scale, the emphasis instead being placed upon clearly illustrating the principles of the present field emission light source. Moreover, in the drawings, like reference numerals designate corresponding parts throughout the several views.

Figure 1:
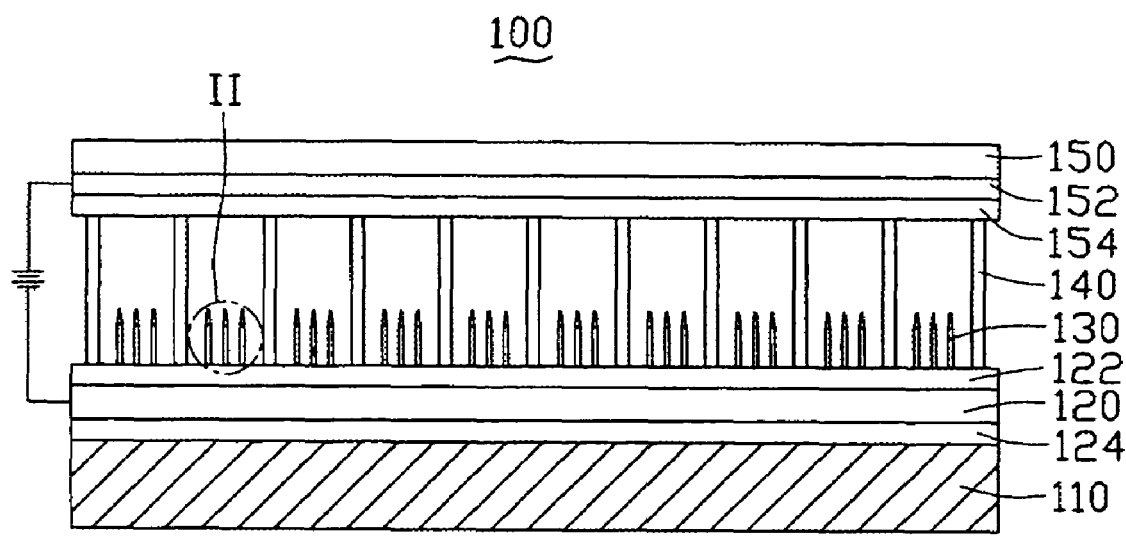
FIG. 1 is a cross-sectional view of a light source, in accordance with a first embodiment of the present device.

Corresponding reference characters indicate corresponding parts throughout the several views. The exemplifications set out herein illustrate at least one preferred embodiment of the present light source, in one form, and such exemplifications are not to be construed as limiting the scope of the invention in any manner.

DETAILED DESCRIPTION OF PREFERRED EMBODIMENTS

Reference will now be made to the drawings to describe embodiments of the present light source, in detail.

Referring to FIG. 1, a light source 100, in accordance with a first embodiment of the present device, includes a lower substrate 110, a cathode 120, an isolating layer 122, a plurality of electron emitters 130, and a light-permeable anode 152. The cathode 120 is formed on the lower substrate 110, and the isolating layer 122 is formed on the cathode 120. The plurality of electron emitters 130 is located on the isolating layer 122, advantageously in a symmetrical pattern. The light-permeable anode 152 is arranged over the isolating layer 122. A nucleation layer 124 may be formed between the lower substrate 110 and the cathode 120. A plurality of spacers 140 may be interposed between the cathode 120 and the anode 152. The cathode 120 and the anode 152 cooperatively form a chamber therebetween. That chamber is advantageously evacuated to form a suitable level of vacuum (i.e., a level conducive to the free movement of electrons therethrough).

The anode 152 is generally a transparent conductive layer disposed on an upper substrate 150, with the upper substrate 150 being made, e.g., of a glass or plastic material. The anode 152 is advantageously made of indium-tin oxide. At least one fluorescent layer 154 is formed on the anode 152 and faces the field emitters 130. The anode 152 and the upper substrate 150 are beneficially highly transparent or at least highly translucent to permit most of the light generated by the at least one fluorescent layer 154 to radiate therethrough.

The lower substrate 110 according to the embodiment is made of a nonmetal material, for example, quartz or glass. Such materials as quartz or glass are beneficial in that they are electrically insulative.

The cathode 120 is generally a conductive layer made of one or more conductive metal material, for example, gold, copper, silver, or their alloys. Gold, copper, and silver are all noble metals, and such metals are known for their excellent conductivity (i.e., both thermal and electrical) and oxidation resistance.

The nucleation layer 124 is formed on the lower substrate 110, and the cathode 120 is, in turn, formed thereon. During manufacture, the nucleation layer 124 is utilized as a substrate for the depositing of the cathode 120. The nucleation layer 124 is preferably configured to be as thin as possible. A thickness of the nucleation layer 124 opportunely is in the range from about 1 nanometer to about 100 nanometers. Preferably, the thickness of the nucleation layer 124 is in the range from about 2 nanometers to about 10 nanometers. The nucleation layer 124 is preferably made of silicon.

Figure 2:
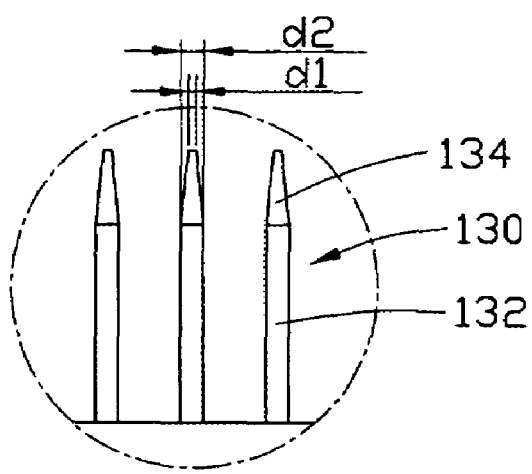
FIG. 2 is a schematic, enlarged view of a field emitter shown in the FIG. 1.

Referring to FIG. 2, the field emitters 130 include a plurality of isolating posts 132 extending from the isolating layer 122, and a plurality of nano-tips 134 formed on the respective top ends of the isolating posts 132.

The isolating posts 132 can be configured to be cylindrical, conical, annular, parallelepiped-shaped, or other suitable shapes. The isolating layer 122 and the isolating posts 132 are advantageously made of essentially the same material as that used for the isolating layer 122, such as silicon carbide, diamond-like carbon, or the like. Further, the isolating layer 122 is advantageously integrally formed with the isolating posts 132.

The nano-tips 134 of the field emitters 130 are formed on the top ends of the isolating posts 132 and project toward the anode 152. The nano-tips 134 are advantageously made of molybdenum, niobium, tungsten, or another durable, emissive metal or alloy. For example, the nano-tips 134 may be in the form of nanorods, nanotubes, nanoparticles, or other nanostructures. Nanotubes are not the most preferred structure, given their tendency to collapse. Yet, due to the mechanical durability of the primary candidate materials, such as molybdenum (Mo), niobium (Nb), and tungsten (W), the tendency of nanotube collapse can at least partially be overcome by employing such materials and thus may successfully permit the use thereof. It is also understood that a substantially solid-cross-section of a given nano-tip 134 (e.g., a porous material or other configuration in which a significant volume percent (e.g., about 50% or more; more ideally, 75% or more; or, preferably, nearly 100% (i.e., essentially non-porous)) is occupied by the emitter material)

would likely prove suitable, especially if used in conjunction with a durable, emissive metal, e.g., Mo, Nb, and/or W It is to be further understood that nano-tips 134 could yet be made of other emissive materials (e.g., carbon, silicon), especially if a substantially solid-cross-section structure is used, and/or could be otherwise configured of other shapes conducive to field emission generation.

The isolating post 132 is advantageously configured to be cylindrical or in another suitable configurations and has a diameter (or width) d2 in the range from about 10 nanometers to about 100 nanometers. The nano-tip 134 is advantageously configured to be in a form of a frustum or a cone. A base of the nano-tip 134 opportunely has diameter about equal to the diameter d2 of the isolating post 132. A top end of nano-tip 134 has diameter d1 in the range from about 0.5 nanometers to about 10 nanometers. A total length L of the isolating post 132 and the corresponding nano-tip 134 combined is advantageously in the range from about 100 nanometers to about 2000 nanometers.

The field emitter 130 may be manufactured by the steps of:
(1) providing a silicon substrate;
(2) forming a silicon carbide layer having a predetermined thickness thereof on the silicon substrate, the silicon carbide layer being formed by a reactive sputtering, a chemical vapor deposition, a plasma-enhanced chemical vapor deposition, an ion-beam sputtering, a dual ion beam sputtering, or otherwise;
(3) depositing a molybdenum layer on the silicon carbide layer by magnetron sputtering, ion-beam sputtering, dual ion-beam sputtering, chemical vapor deposition, plasma-enhanced chemical vapor deposition, or otherwise; and
(4) etching the molybdenum layer and the silicon carbide layer by a chemical etching process or otherwise, thereby obtaining the nano-tip 134 and the isolating post 132. The silicon carbide layer may be utilized as the isolating layer 122.

In operation electrons emitted from the field emitters 130 are, under an electric field applied by the cathode 120 and the anode 152, accelerated and then collide with a fluorescent material of the fluorescent layer 154. The collision of the electrons upon the florescent layer 154 causes such layer 154 to fluoresce and thus emit light therefrom.

Figure 3:
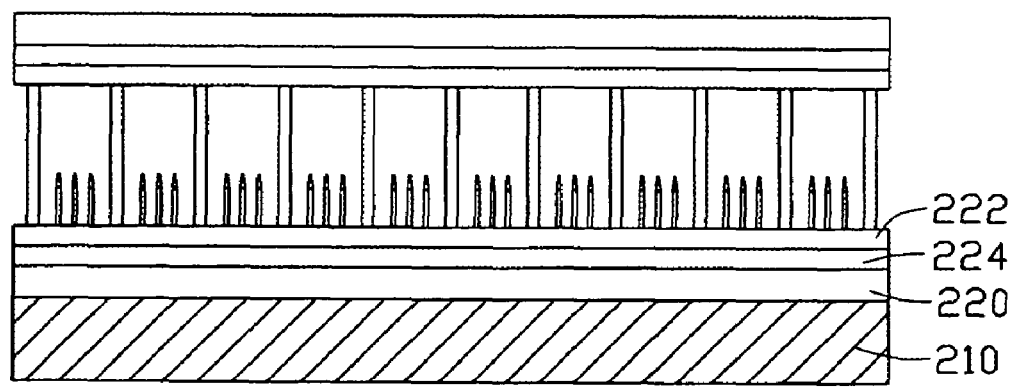
FIG. 3 is a cross-sectional view of a light source, in accordance with a second embodiment of the present device.

Referring to FIG. 3, a light source 200, in accordance with a second embodiment of the present device, is provided. Compared with the first embodiment, the light source 200 includes a lower substrate 210 made of metal or alloy, a cathode 220 formed on the lower substrate 210, a nucleation layer 224 formed on the cathode 220, and a isolating layer 222 formed on the nucleation layer 224. During manufacture, the nucleation layer 224 is utilized as a substrate for the depositing of the isolating layer 222 and the isolating posts 230 thereon. Thus, a material of the nucleation layer 224 should be chosen according to the materials of the isolating layer 222. For example, if the isolating layer 222 is made of silicon carbide, the nucleation layer 224 is preferably made of silicon. The nucleation layer 224 is beneficially suitably conductive to facilitate conductance of electrons from the cathode 220 to the isolating layer 222.

Figure 4:
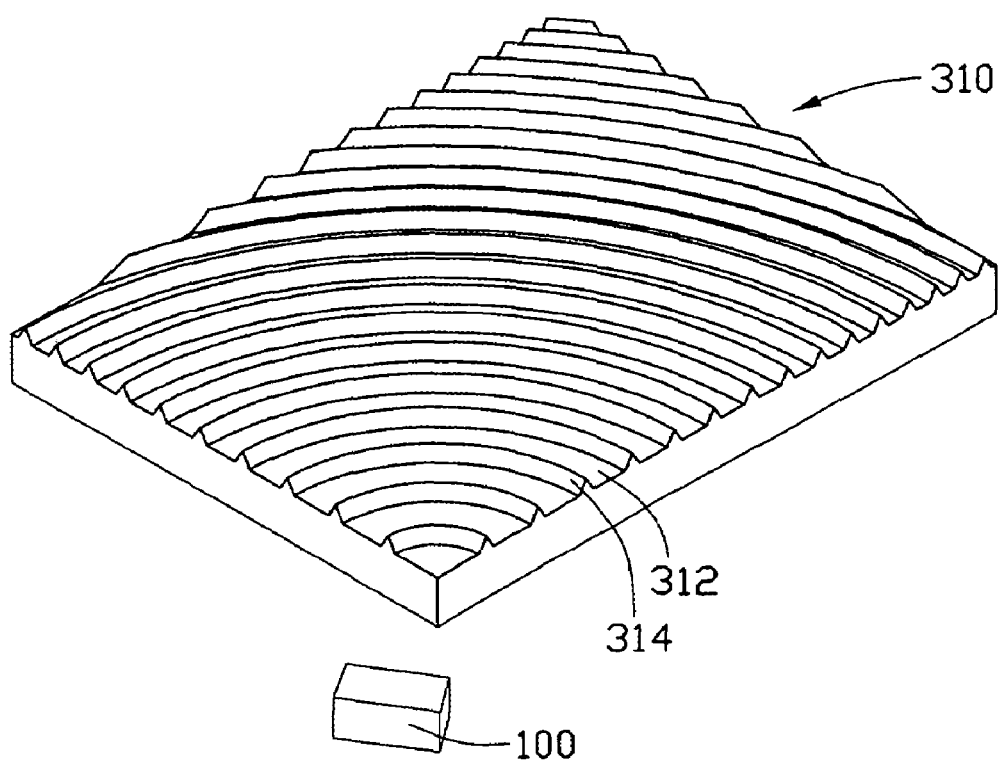
FIG. 4 is a perspective view of a backlight device, in accordance with a third embodiment of the present device.
Figure 5:
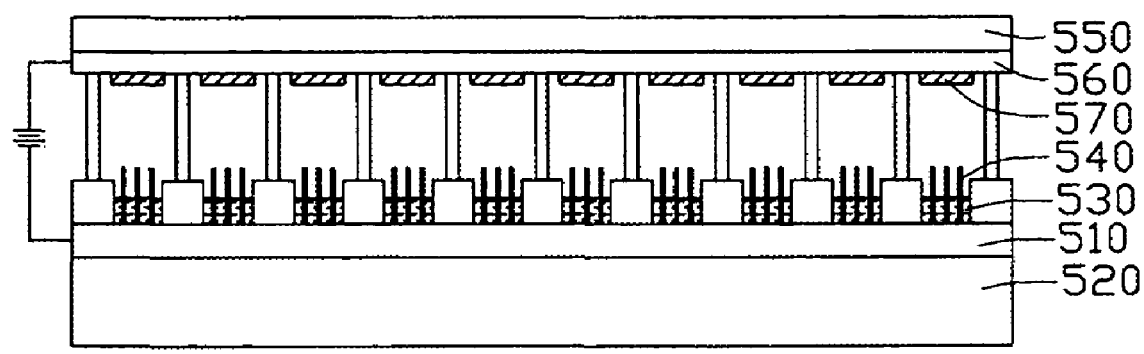
FIG. 5 is a cross-sectional view of a conventional light source, employing carbon nanotubes as field emitters.

Referring to FIG. 4, a backlight device 300, in accordance with a third embodiment of the present device, is provided. The backlight device 300 includes a light source 100 and a light guide plate 310 having a light emitting surface 312. The light source 100 is beneficially arranged at a corner of the light guide plate 310. The light emitting surface 312 of the light guide plate 310 is patterned with a plurality of arc shapes 314 (i.e., arcuate protrusions of triangular cross-section), and the arc density (i.e., the number of arcuate protrusions in a given area) increases with increasing distance away from the light source 100.

It should be noted that the above-described light guide plate 310 has been provided for the purposes of illustrating the present invention. The configuration of the light guide plate 310 is not critical to practicing the present invention. A variety of conventional light guiding plates are known to those skilled in the art and may be suitably adapted for practicing the present invention. In particular, configurations of the light emitting surface 312 are exemplified herein for illustration purposes only and are not intended to limit the present invention.

Furthermore, as is known to those skilled in the art, the backlight device 300 may further include one or more of optical elements (not shown), such as a reflecting plate disposed facing the light reflecting surface of the light guiding plate 310, a diffusing plate disposed facing the light emitting surface 312 of the light guiding plate 310, and/or a brightness-enhancing plate stacked over the diffusing plate. Also, it is to be understood that a plurality of the light sources 100 and/or 200 could be employed with respect to the backlight device 300.

Finally, it is to be understood that the above-described embodiments are intended to illustrate rather than limit the invention. Variations may be made to the embodiments without departing from the spirit of the invention as claimed. The above-described embodiments illustrate the scope of the invention but do not restrict the scope of the invention.

I claim:
1. A light source comprising:
a substrate having a surface;
a cathode with at least one substantially solid-cross-section electron emitter formed thereon, the cathode being located on the surface of the substrate, each electron emitter including an isolating post extending from the isolating layer and a nano-tip formed on a top end of the respective isolating post, the nano-tip being comprised of an emissive metal material;
an isolating layer formed on the cathode;
a light-permeable anode facing the field emitters and being spaced from the cathode to form a vacuum chamber; and
at least one fluorescent layer formed on the anode.
2. The light source as claimed in claim 1, wherein the isolating posts and the isolating layer are made of the same material.
3. The light source as claimed in claim 2, wherein the isolating posts and the isolating layer are made of one of silicon carbide and diamond-like carbon.
4. The light source as claimed in claim 1, wherein the nano-tip is comprised of niobium.
5. The light source as claimed in claim 1, wherein the isolating post is one of cylindrical, conical, annular, and parallelepiped-shaped.
6. The light source as claimed in claim 1, wherein the nano-tip is in a form of a frustum or a cone.
7. The light source as claimed in claim 1, wherein a base of the nano-tip has diameter about equal to the diameter of the isolating post.
8. The light source as claimed in claim 1, wherein each isolating post and the corresponding nano-tip have a total length in the range from about 100 nanometers to about 2000 nanometers.

9. The light source as claimed in claim 1, wherein the isolating post has at least one of a width and a diameter in the range from about 10 nanometers to about 100 nanometers.

10. The light source as claimed in claim 1, wherein the nano-tip has a diameter in the range from about 0.5 nanometers to about 10 nanometers.

11. The light source as claimed in claim 1, wherein the substrate is comprised of one of quartz and glass.

12. The light source as claimed in claim 11, wherein the light source further includes a nucleation layer sandwiched between the substrate and the cathode.

13. The light source as claimed in claim 1, wherein at least 75 volume percent of each nano-tip is occupied by the emissive metal material.

14. The light source as claimed in claim 1, wherein the substrate is comprised of one of a metal and an alloy.

15. The light source as claimed in claim 14, wherein the light source further includes a nucleation layer sandwiched between the cathode and the isolating layer.

16. A backlight device comprising:
a light source comprising:
   a cathode;
   a plurality of substantially solid-cross-section field emitters located on the cathode, each electron emitter including an isolating post extending from the isolating layer and a nano-tip formed on a top end of the respective isolating post, the nano-tip being comprised of an emissive metal material; and
   a light-permeable anode arranged over and facing the field emitters; and
a light guide plate having a portion thereof facing the light-permeable anode, the portion thereof facing the light-permeable anode being adapted for receiving light emitted from the light source.

17. The backlight device as claimed in claim 16, wherein the light guide plate includes a light emitting surface, the light emitting surface being patterned with a plurality of arc shapes thereon.

18. The backlight device as claimed in claim 16, wherein at least 75 percent of the volume of each nano-tip is occupied by the emissive metal material.

* * * * *